UNITED STATES PATENT OFFICE.

ALBRECHT SCHMIDT AND GEORG KRÄNZLEIN, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

PURE β-ANTHRAQUINONYL-UREA-CHLORID AND PROCESS OF MAKING SAME.

1,038,003.  Specification of Letters Patent.  Patented Sept. 10, 1912.

No Drawing.  Application filed May 11, 1910.  Serial No. 560,736.

*To all whom it may concern:*

Be it known that we, ALBRECHT SCHMIDT, Ph. D., chemist, and GEORG KRÄNZLEIN, Ph. D., chemist, citizens of the Empire of Germany, residing at Höchst-on-the-Main, Germany, have invented certain new and useful Improvements in a Pure β-Anthraquinonyl-Urea-Chlorid and Process of Making Same, of which the following is a specification.

β-anthraquinonyl-urea-chlorid and a mode of preparing it in a pure state have not hitherto been disclosed. German Patent No. 167410 contains a statement in connection with the anthraquinonyl-urethanes to the effect that the urethanes, viz:—those of the α- and β-aminoanthraquinone, can also be produced by causing phosgen to act upon the amino anthraquinones and treating with alcohol the carbonyl chlorids thus obtained. No mention is made of the production of pure carbonyl-chlorids, particularly of β-anthraquinonyl-urea-chlorid. The said statement has evidently no positive meaning, since it has been found that no pure urea chlorid at all is obtainable from α-aminoanthraquinone. However, according to the surprising discovery we have made, β-anthraquinonyl-urea-chlorid as such can be produced from β-aminoanthraquinone by a reaction which, in view of the behavior of other bases, may be regarded as abnormal, and only under conditions which could not be foreseen. According to what is the case with aromatic amins, it was to be expected that by the action of phosgen on aminoanthraquinones no pure anthraquinonyl-urea-chlorids, but instead mixtures of them with the hydrochlorids of aminoanthraquinones, would be obtained, that is to say, products of no technical value. This, as has been proved, is indeed at first the case with β-aminoanthraquinone, if certain conditions are not observed (in the case of α-aminoanthraquinone the reaction is of a still more complicated nature). As is known, by the action of phosgen upon amins, for instance diphenylamin, dinaphthylamin, phenetidin and the like, there is always produced a molecular mixture partly of urea-chlorid and partly of hydrochlorid of amin. For instance on causing phosgen to act upon diphenylamin (compare *Ber.* 9, 396, *Bull. de la Société Chimique*, new series 25, 251) the reaction is as follows:

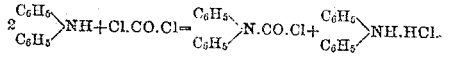

As is known, this is a typical reaction (compare also *Ber.* 23, 428 dinaphthyl-urea-chlorid). If applied to the β-aminoanthraquinone, the reaction should be as follows:

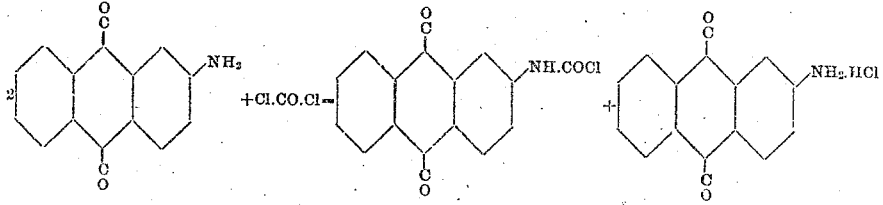

As the mixture expected to result from the above reaction, consisting of β-anthraquinonyl-urea-chlorid, insoluble or difficultly soluble in indifferent solvents, and of insoluble hydrochlorid of aminoanthraquinone, cannot be separated, it was accordingly not possible to obtain in this manner a pure urea-chlorid. This is indeed the case under ordinary conditions. We have found that if, for instance, phosgen is introduced into a suspension of β-aminoanthraquinone in toluene in the cold, or if a suspension of β-aminoanthraquinone in benzene is added to a solution of phosgen in benzene, a mixture is obtained, consisting of hydrochlorid of β-aminoanthraquinone and urea-chlorid, which cannot be separated by any solvent and which is therefore unsuitable for a number of reactions.

By means of the dyestuff obtainable from the pure β-anthraquinonyl-urea-chlorid and anilin it is possible to ascertain the above mentioned result of the reaction. If, for instance, the aforesaid mixture, consisting of hydrochlorid of β-aminoanthraquinone and β-anthraquinonyl-urea-chlorid is treated with anilin, a mixture, of no technical value, of β-anthraquinone with β-anthraquinonyl-phenyl-urea is obtained. This mixture can be recognized as such, upon recrystallizing it in a larger quantity of nitrobenzene; moreover it can be ascertained by reducing the mixture and dyeing on the fiber, for, while the β-anthraquinonyl-phenyl-urea dyes cotton and wool very pure yellow tints, the said mixture dyes reddish-yellow tints which are not fast, which is particularly apparent in wool dyeing.

In spite of what has been said before, we have made the surprising discovery that β-anthraquinonyl-urea-chlorid can be obtained as such from β-aminoanthraquinone and phosgen in a pure state, i. e. not mixed with hydrochlorid of β-aminoanthraquinone, under the following new and uniform conditions: We have found that the hydrochlorid of β-aminoanthraquinone will gradually disappear from the initial reaction-mass, if phosgen is caused to act upon it in the cold until there is no further escape of hydrochloric acid, particularly if an excess is used, or by causing phosgen to act upon it in a gentle heat, which facilitates the reaction; we have furthermore ascertained that also by the action of phosgen upon a suspension of hydrochlorid of β-aminoanthraquinone in nitrobenzene (less promptly in toluene) β-anthraquinonyl urea-chlorid is gradually formed with gradual liberation of hydrochloric acid. Consequently the process consists of the following operations: Phosgen is caused to act upon β-aminoanthraquinone or hydrochlorid of β-aminoanthraquinone for so long a time and under such conditions that the hydrochlorid of β-aminoanthraquinone disappear entirely or at least for a greater part from the reaction mass, which can be easily ascertained by a test in working it up into β-anthraquinonyl-phenyl-urea. The reaction is effected either by a prolonged action of phosgen, advantageously with an excess, upon β-aminoanthraquinone in the cold (preferably for instance in a suspension of nitrobenzene), or by using phosgen, advantageously with a slight excess, in a gentle heat, also preferably for instance in a suspension of nitrobenzene. In the event of gently heating, the temperature must not be allowed to rise so high that β-β dianthraquinonyl-urea forms; thus, for instance, a temperature of about 100° C. may still be used. Consequently a slight excess or almost the theoretical quantity of phosgen will suffice if phos n is caused to act upon β-aminoanthraquinone preferably in nitrobenzene in the heat, for instance at temperatures of from 40° to about 120° C. This is also a quite surprising fact, because it could not to be expected that a β-anthraquinonyl-urea-chlorid possesses such a stability.

Example I: A large excess of phosgen is introduced while stirring into a cold suspension of 200 grams of β-aminoanthraquinone in 2 kilos of nitrobenzene and the stirring is continued until a filtered test, on treatment with anilin, yields β-anthraquinonyl-phenyl-urea, dyeing pure yellow tints. The grayish-white product thus obtained is filtered off, washed with carbon tetrachlorid and dried in vacuo.

Example II: A little more than the calculated quantity of phosgen is introduced in the course of several hours into a suspension of 200 grams of β-aminoanthraquinone in 2 kilos of nitrobenzene at about 50° C. while stirring, preferably under slight pressure. The filtered off product which is washed with carbon tetrachlorid is pure.

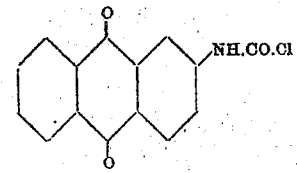

Calculated for
Cl=12.21%
N= 4.88%

Found:
Cl=12.28%
N= 4.99%

The new product is a gray powder which when heated with anilin yields β-anthraquinonyl-phenyl-urea of the composition $C_{21}H_{14}N_2O_3$, soluble in concentrated sulfuric acid with a yellowish color.

For further working up the urea chlorid it is not necessary to isolate the same, but the mass obtained can be immediately worked up by previously removing the slight excess of phosgen and the hydrochlorid acid by means of a dry current of air.

If instead of nitrobenzene, for instance toluene is employed, the conversion into urea-chlorid occurs considerably more slowly and is generally terminated only after 20 hours.

Having now particularly described our invention, what we claim is:

1. As a new product, β-anthraquinonyl-urea-chlorid in a pure state free from hydrochlorid of β-aminoanthraquinone, being a gray powder which when heated with anilin yields β-anthraquinonyl-phenyl-urea of the composition $C_{21}H_{14}N_2O_3$, soluble in concentrated sulfuric acid with a yellowish color.

2. The process of manufacturing β-anthraquinonyl-urea-chlorids in a pure state free from hydrochlorid of β-aminoanthraquinone, which consists in causing phosgen to act upon β-aminoanthraquinone, in the presence of a solvent until the hydrochlorid of β-aminoanthraquinone, which forms first, has disappeared from the reaction-mass, and has changed into β-anthraquinone-urea-chlorid.

3. The process of manufacturing β-anthraquinonyl-urea-chlorids in a pure state free from hydrochlorid of β-amino-anthraquinone, which consists in causing phosgen to act upon β-aminoanthraquinone in the presence of a solvent at temperatures of from 40° to 120° C., until the hydrochlorid of β-amino-anthraquinone, which forms first, has disappeared from the reaction-mass, and has changed into β-anthraquinone-urea-chlorid.

In testimony whereof, we affix our signatures in presence of two witnesses.

ALBRECHT SCHMIDT.
GEORG KRÄNZLEIN.

Witnesses:
BERNHARD LEYDECKER,
OTTO RUPPELIUS.